United States Patent [19]
Takahashi

[11] Patent Number: 5,084,861
[45] Date of Patent: Jan. 28, 1992

[54] DISC CARTRIDGE HAVING MOLDED DISK SUPPORT ELEMENTS ATTACHED BY RIGID LEGS

[75] Inventor: Kenji Takahashi, Miyagi, Japan
[73] Assignee: Sony Corporation, Tokyo, Japan
[21] Appl. No.: 242,207
[22] Filed: Sep. 9, 1988
[30] Foreign Application Priority Data
  Sep. 24, 1987 [JP] Japan .......................... 62-145483[U]
[51] Int. Cl.⁵ .................. G11B 23/03; G11B 7/26; B65D 85/30
[52] U.S. Cl. ..................... 369/291; 360/133; 206/309; 206/444
[58] Field of Search ............. 369/191, 290, 291; 360/133; 206/444, 309

[56] References Cited
U.S. PATENT DOCUMENTS

| | | | |
|---|---|---|---|
| 4,644,434 | 2/1987 | Oishi et al. | 360/133 |
| 4,700,338 | 10/1987 | Sugihara et al. | 369/77.1 |
| 4,839,764 | 6/1989 | Ikedo et al. | 360/98.08 |
| 4,858,050 | 8/1989 | Ashe et al. | 369/291 X |
| 4,862,448 | 8/1989 | Tanaka et al. | 369/291 |
| 4,888,761 | 12/1989 | Ohta | 360/133 X |

*Primary Examiner*—Stuart S. Levy
*Assistant Examiner*—Kenneth B. Wells
*Attorney, Agent, or Firm*—Lewis H. Eslinger; Jay H. Maioli

[57] ABSTRACT

A disk cartridge formed of upper and lower halves for rotatably accommodating a disk is provided with disk supporters fixed on the inner wall of the cartidge at positions corresponding to non-signal recording portions on the inner and outer peripheral sides of the disk. The disk is supported by the disk supporters fixed on one of the halves when the disk is not being used. Each supporter is formed of a flexible disk supporting member and a plate-shaped leg member made a material having a rigidity higher than that of the disk supporting member. The leg member is integrated with the disk supporting member by resin molding so that its end portions protrude from the disk supporting member, and the disk supporting member is fixed on the inner walls of the halves by calking the leg member.

6 Claims, 4 Drawing Sheets

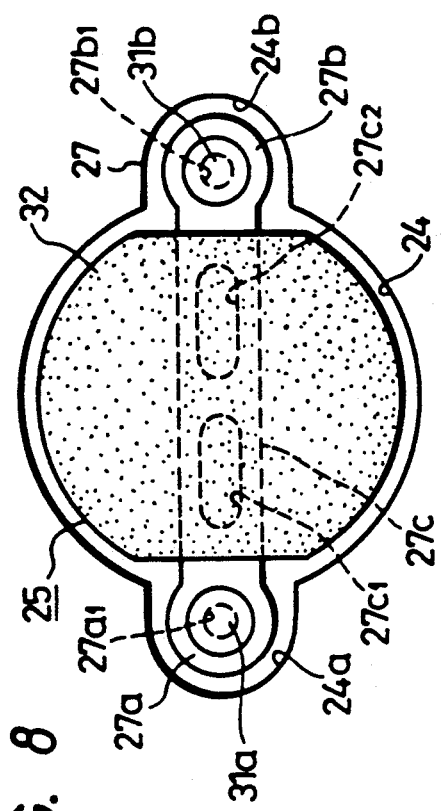
FIG. 6
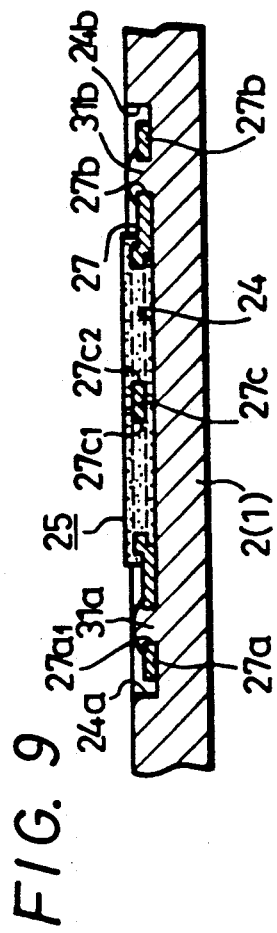
FIG. 7
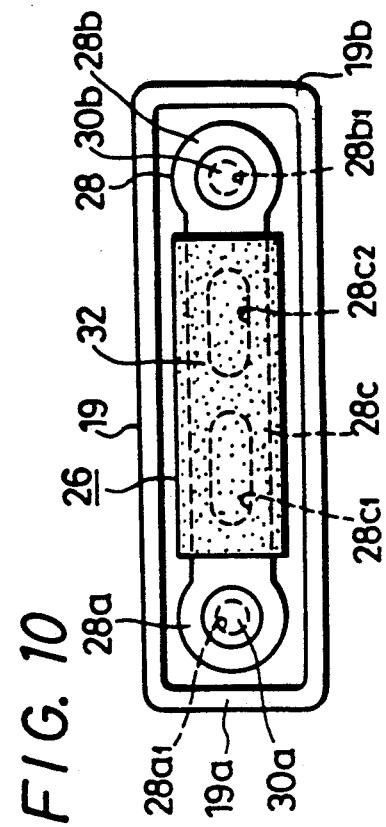
FIG. 8
FIG. 9
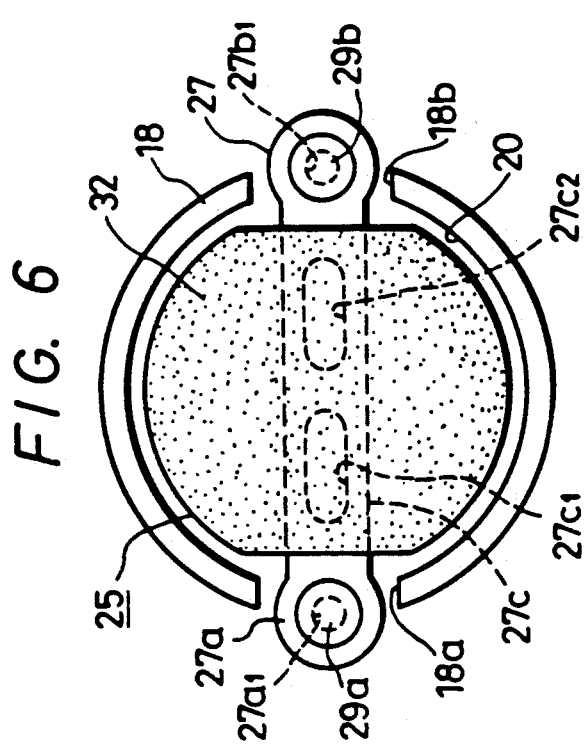
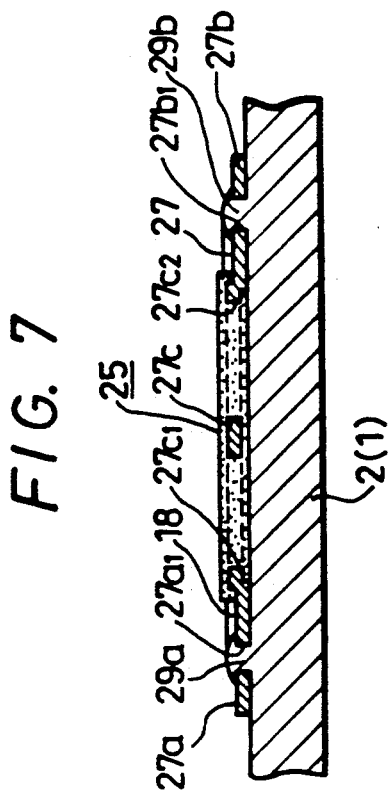
FIG. 10

DISC CARTRIDGE HAVING MOLDED DISK SUPPORT ELEMENTS ATTACHED BY RIGID LEGS

BACKGROUND OF THE INVENTION

1. Field of the Invention

The present invention relates to a disk cartridge for rotatably accommodating a disk such as a WRITE ONCE type optical disk and so on.

2. Description of the Prior Art

A disk such as a WRITE ONCE type optical disk or the like is generally accommodated in a predetermined disk cartridge for protecting read and write errors of information signals caused by stain and scratch due to attached dust and damage due to contact with other disks and so on when the disk is not in service, i.e. when the disk is not loaded in a recording and/or reproducing apparatus. Such disk cartridge, as disclosed in Japanese Patent Publication No. 61-3015, is provided on its upper and lower halves with openings for exposing a portion of a signal recording portion of a disk accommodated in the cartridge and a chucking portion of the disk arranged at its central portion of the rotation. Also, disk supporting ribs are protrusively formed integrally with the cartridge halves, to avoid the contact of at least the recording portion of the disk with the inner walls of the cartridge halves, such that the disk is supported by the ribs at its non-recording portion.

In the disk cartridge constructed as mentioned above wherein the ribs formed integrally with the cartridge are used to support the disk, there is no shock absorbing effect on the disk so that there is a fear that the disk accommodated in the cartridge may be damaged by shock given thereto during transportation and so on, particularly if the base of the disk is made of synthetic resin such as polycarbonate. Thus, there is proposed, as disclosed, for example, in International publication No. W088/00385, that flexible shock absorbing pieces made e.g. of rubber plate or the like are arranged on the inner walls of the cartridge for supporting the disk so as to prevent the disk from being damaged by the above-mentioned shock.

To fix rubber plates as shock absorbing pieces on the inner walls of the cartridge, the rubber plate may be bonded with a bonding agent at predetermined positions on the inner walls of the upper and lower halves of the cartridge. Alternatively, pairs of protruded pins are formed at the respective predetermined positions and each rubber plate has a pair of horizontal leg portions integrated with its peripheral surface which repectively have bores at the positions corresponding to the pins, such that each pin is inserted into the bore of the rubber plate and the head of each pin is calked by ultra-sonic calking to thereby fix the rubber plate through the horizontal leg portion. The disk is thus supported by the rubber plates fixed on the inner walls of the upper and lower cartridge halves to thereby prevent damage caused by the aforementioned shock.

In the conventional disk cartridge constructed as described above wherein the rubber plates serving as the shock absorber are bonded with a bonding agent on the inner wall of the cartridge, if the bonding agent is excessively applied, it is not only extruded from the outer periphery of the rubber plate but also attached to the surface of the disk, with the result that the disk is stained by the extruded bonding agent. On the other hand, if the applied amount of the bonding agent is not sufficient, the rubber plate cannot be perfectly bonded and may be peeled from the inner wall of the cartridge by vibration of the disk, whereby the disk makes direct contact with the inner wall of the disk cartridge or the like. Thus, difficulties are encountered in controlling the applied amount and applied position of bonding agent for bonding the rubber plates.

In the case of fixing the rubber plates by calking the pins protruded on the inner wall of the disk cartridge halves, the horizontal leg portions for inserting the pin to be calked are also formed integrally with the rubber plate, thereby occurring variations or scatterings in the thickness of the leg portions. Since the scattering in the thickness of the leg portions cannot be suppressed in the molding thereof, the height of the calked pins is to be adjusted in the process of calking the pin in a manner that the height of the calked pin is lower than the disk receiving surface of the rubber plates. However, such adjustment is extremely difficult. Specifically, if the pin is calked so that the leg portion is pressed in order to lower the height of the pin, the entire disk receiving surface of the rubber plate is protrusively deformed, whereby the disk cannot be evenly supported with stability and consequently the disk may be deformed. Therefore, the pin must be calked so that a spacing is provided between the resulting calked pin and the leg portion of the rubber plate. Such work requires an extremely high accuracy and therefore working efficiency becomes lower.

In addition to the above-mentioned defects, since the leg portion of the rubber plate is integrated with the plate proper and lacks rigidity, torsion of the rubber plate caused by vibration and friction of the disk which is produced by shock applied to the disk when the disk cartridge is dropped or the like may arouse concern that the leg portion will be removed from the calking pin and consequently the rubber plate will be detached from the inner wall of the cartridge. The lack of rigidity in the leg portion makes it difficult to automatically mount the rubber plates on the cartridge halves, so that hand working must be introduced for the mounting which requires much more processes than the automatic mounting and therefore causes problems such as reduced manufacturing efficiency.

OBJECTS AND SUMMARY OF THE INVENTION

In view of the problems mentioned above, it is an object of the present invention to provide a disk cartridge which is capable of ensuring the stable fixture of disk supporting members even when the disk supporting member is made of sufficiently flexible material having a high shock absorbing effect such as silicone rubber or the like to thereby support the disk stably in the disk cartridge.

To achieve the above object, the present invention provides a disk cartridge, comprising:

a cartridge body formed of a pair of upper and lower halves for rotatably accommodating a disk therein;

disk supporting means fixed to the inner walls of the halves forming the cartridge body at positions corresponding to non-signal recording area on the inner and outer peripheral sides of the disk;

the disk cartridge being characterized in that the supporting means is formed of a flexible disk supporting member and a plate-shaped leg member made of a material having a rigidity higher than that of the disk supporting member, the leg member being coupled to the disk supporting member so that its end portions are protruded from the disk supporting member, the disk supporting member is fixed to the inner walls of the halves by calking the leg member and the disk is supported by the disk supporting members fixed on one of the halves when the disk is not used.

The above and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 6 is a top plan view showing that the circular disk supporting member is inserted into an inner peripheral side concave disk supporting portion;

FIG. 7 is a cross-sectional view of FIG. 6;

FIG. 8 is a top plan view showing that the circular disk supporting member shown in FIG. 4 is inserted into an outer peripheral side concave disk supporting portion;

FIG. 9 is a cross-sectional view of FIG. 8; and

FIG. 10 is a top plan view showing that the rectangular disk supporting member shown in FIG. 5 is inserted into an outer peripheral side concave disk supporting portion.

DETAILED DESCRIPTION OF THE PREFERRED EMBODIMENT

An embodiment of the present invention will hereinafter be described with reference to FIGS. 1–10.

Figure 1:
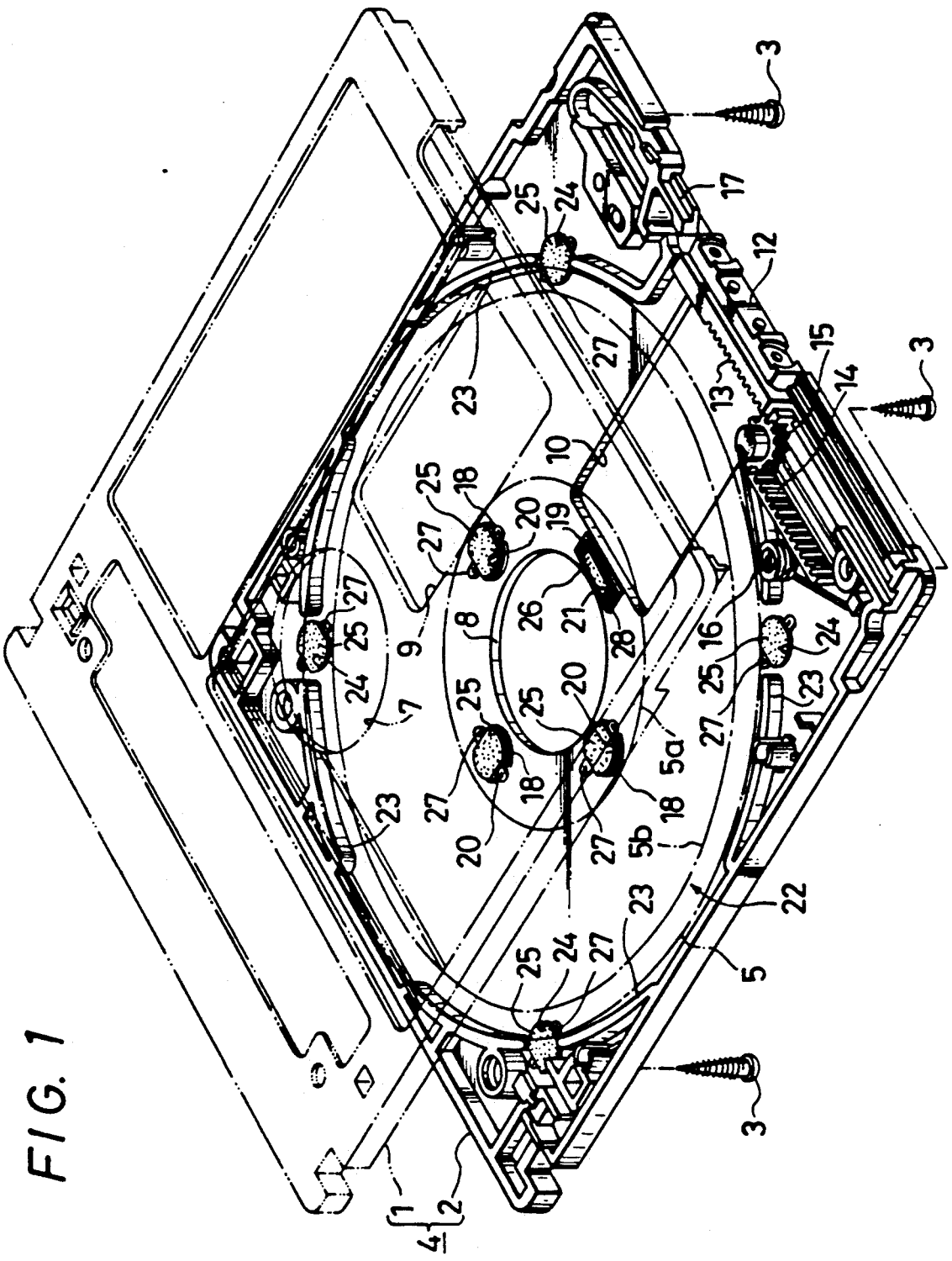
FIG. 1 is a perspective view showing mainly a lower half forming the disk cartridge according to the present invention.
Figure 2:
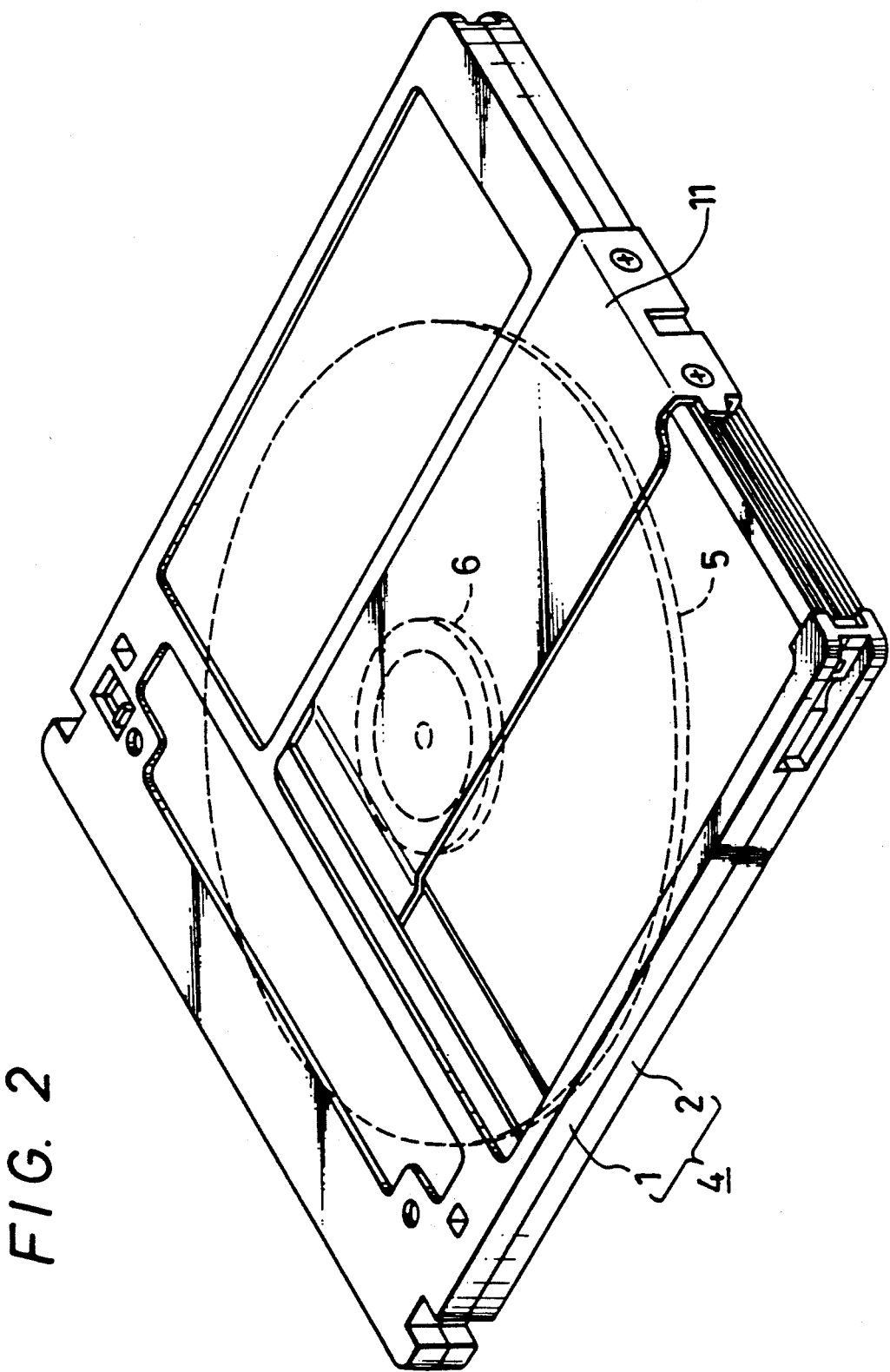
FIG. 2 is a perspective view showing the appearance of the disk cartridge of the present invention.

A disk cartridge according to the present invention is arranged, as shown in FIGS. 1 and 2, such that a disk 5 such as a WRITE ONCE type optical disk or the like which permits data to be recorded therein or the like is rotatably accommodated in a cartridge 4 which is formed by abutting and fixing rectangular upper and lower halves 1 and 2 with a plurality of screws 3. Chucking mechanism insertion openings 7 and 8 are respectively formed through central portions of the upper and lower cartridge halves 1 and 2 which constitute the cartridge 4 so as to expose a chucking hub 6 provided at a central portion of the disk 5 accommodated in the cartridge 4. Opening portions 9 and 10 are respectively formed through the upper and lower halves 1 and 2 in the direction to the front edges thereof with a predetermined distance from the insertion openings 7 and 8, thus exposing the signal recording portion of the disk 5 to the outside along its diametrical direction and facing to information signal writing and reading means such as an optical pickup or the like for recording a predetermined information signal on the disk 5 and for reading the recorded information signal therefrom.

The cartridge 4 is provided with a slide shutter 11 which opens and closes the chucking mechanism insertion openings 7 and 8 and the opening portions 9 and 10. The shutter 11 is formed by bending a thin stainless steel plate or the like in a U-shape. The shutter 11 is engaged with the outer side wall of the cartridge 4 and fixed to a slide base 12 which is fitted laterally slidable along a front edge portion of the cartridge 4 in the direction in which the shutter 11 opens and closes the chucking mechanism insertion openings 7 and 8 and the opening portions 9 and 10. The slide base 12 to which the shutter 11 is fixed is biased by a torsion spring 16 through an interlock mechanism formed of a first rack gear 13 formed on the inner side wall of the slide base 12, a second rack gear 14 formed on the lower half 2 and a pinion gear 15 rotatably engaged between these rack gears 13 and 14 in a manner that the shutter 11 normally closes the chucking mechanism insertion openings 7 and 8 and the opening portions 9 and 10.

The lower half 2 constituting the cartridge 4 is provided with a locking member 17 formed at the position corresponding to the closed end portion of the shutter 11 to lock the shutter 11 at the closed end position when the shutter 11 reaches the closed position.

On the inner wall of the upper and lower halves 1 and 2 constituting the cartridge 4 and in the inner peripheral side area that surrounds the chucking mechanism insertion openings 7 and 8, a plurality of arc-shaped frame ribs 18 and a rectangular rib 19 are protrusively formed with a predetermined distance in the circumferential direction corresponding to a non-signal recording portion 5a positioned in the inner periphery of the disk 5, thus forming inner peripheral side concave supporting portions 20 and 21. Also, arc-shaped ribs 23 are protruded on the inner side walls of the upper and lower halves 1 and 2 in inwardly contact with their outer side walls to thereby form a disk accommodation portion 22. In the outer peripheral side area located at the position corresponding to the circumference along which the arc-shaped ribs 23 are located, a plurality of circular outer peripheral concave supporting portions 24 are formed in a spot-facing fashion in accordance with a non-signal recording portion 5b positioned on the outer peripheral side of the disk 5.

Figure 5:
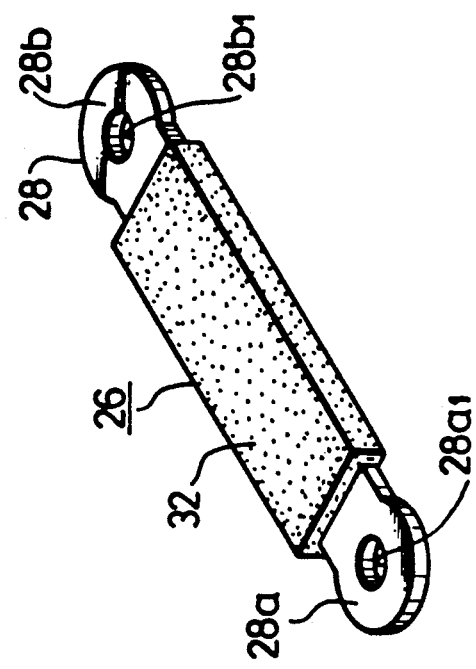
FIG. 5 is a perspective view showing a rectangular disk supporting member employed in the present invention.
Figure 4:
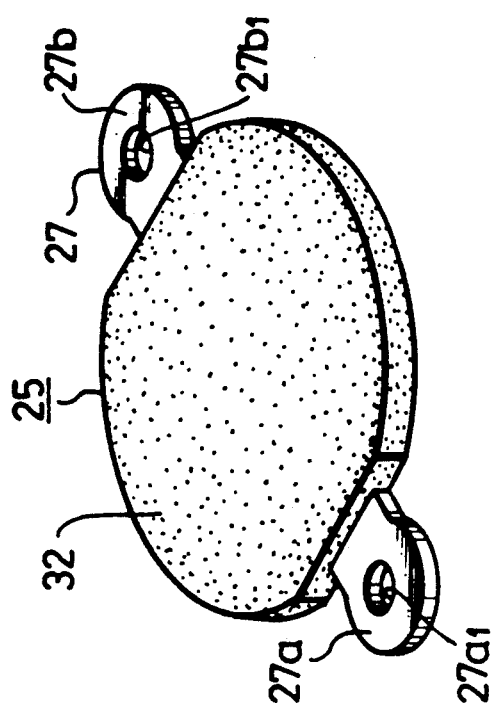
FIG. 4 is a perspective view showing a circular disk supporting member employed in the present invention.

The circular inner peripheral concave supporting portions 20 and the circular outer peripheral concave supporting portions 24 are each engaged with circular disk supporting means, formed as shown in FIG. 4. The rectangular inner peripheral concave supporting portion 21 is engaged with a rectangular disk supporting member, formed as shown in FIG. 5. These disk supporting means are each formed so that a circular disk supporting member 25 and a rectangular disk supporting member 26 each made of, for example, sufficiently elastic silicone rubber are respectively inserted with leg members 27 and 28 each made of a metal plate such as a stainless steel plate or the like, which is formed by pressing, with their two end portions 27a, 27b and 28a, 28b protruded from the disk supporting members 25 and 26 by resin-molding, for example, insert-molding.

The leg members 27 and 28 have bores 27a1, 27b1 and 28a1, 28b1, respectively formed through the end portions 27a, 27b and 28a, 28b. Central portions 27c and 28c of the leg members 27 and 28 are protruded toward the surface sides thereof and provided with long bores 27c1, 27c2 and 28c1, 28c2, respectively, as shown in FIGS. 6 to 10. The protruded central portions 27c and 28c of the leg members 27 and 28 are respectively embedded in or inserted into the disk supporting members 25 and 26. Silicone rubber pieces forming the disk supporting members 25 and 26 have their portions on the surface side and rear surface side of the protruded central portions 27c and 28c integrated through the long bores 27c1, 27c2 and 28c1, 28c2, whereby the disk supporting members 25 and 26 can be favorably stuck to the leg members 27 and 28, respectively. In this condition, the rear surfaces of the disk supporting members 25 and 26 are respectively made flush with the rear surfaces of the two end portions 27a, 27b and 28a, 28b of the leg members 27 and 28. In the illustrated example, each of the leg members 27 and 28 is generally formed in a rectangular shape. However, the leg member 27 which is embedded in the disk-shaped disk supporting member 25 may have the protruded central portion 27c formed in a circular shape having a diameter slightly smaller than that of the disk supporting member 25. Further, the material for forming the leg members 27 and 28 is not limited to a metal plate, and a rigid plate such as a rigid resin plate may be employed in place of the metal plate, provided that the rigid resin plate has rigidity and a melting point higher than that of the material forming the disk supporting members 25 and 26.

The disk supporting members 25 and 26 formed as described above are formed to be slightly thicker than the depths of the inner peripheral concave supporting portions 20, 21 and the outer peripheral concave supporting portions 24 and are slightly smaller than the concave supporting portions 20, 21 and 24. Thus, when the disk supporting members 25 and 26 are inserted into the respective supporting portions 20, 21 and 24, the upper surfaces, that is, the disk supporting surfaces thereof are respectively protruded from the supporting portions 20, 21 and 24 and very narrow spacings are respectively formed between the outer peripheral walls and of the disk supporting members 25 and 26 and the inner peripheral surfaces of the supporting portions 20, 21 and 24.

The respective concave supporting portions 20, 21 and 24, into which the disk supporting members 25 and 26 are inserted, are provided with a pair of protruded pins 29a, 29b; 30a, 30b and 31a, 31b which are respectively inserted into the attaching bores 27a1, 27b1 and 28a1, 28b1 of the leg members 27 and 28.

Specifically, as shown in FIGS. 6 and 7, the circular inner peripheral concave supporting portions 20 are each formed with a pair of notches 18a and 18b in the arc-shaped frame ribs 18 for inserting thereinto the two end portions 27a and 27b of the leg member 27 in the diametrical direction. Pins 29a and 29b are implanted approximately at the center of the notches 18a and 18b, respectively.

The rectangular frame-shaped rib 19 of the rectangular inner peripheral concave supporting portion 21, as shown in FIG. 10, has extensions 19a and 19b formed at the two longitudinal end portions thereof for inserting the end portions 28a and 28b of the leg member 28 of the disk supporting member 26 thereinto. And the pins 30a and 30b are implanted on the extensions 19a and 19b, respectively.

Each of the circular outer peripheral concave supporting portions 24, as shown in FIGS. 8 and 9, has a pair of recesses 24a and 24b formed opposite to each other along the diametrical direction of the circular spot-facing portion and into which the end portions 27a and 27b of the leg member 27 of the disk supporting member 25 are respectively inserted. Pins 31a and 31b are protrusively formed on the recesses 24a and 24b, respectively.

The circular inner peripheral concave supporting portions 20 and the outer peripheral concave supporting portions 24 are each engaged with the circular disk supporting member 25 inserted thereinto, and each pair of the pins 29a, 29b and 31a, 31b are respectively inserted into the attaching bores 27a1 and 27b1 at the two end portions of the leg member 27.

The rectangular inner peripheral concave supporting portion 21 is engaged with the rectangular disk supporting member 26, and the pair of the pins 30a and 30b are inserted into the attaching bores 28a1 and 28b1 at the two end portions of the leg member 28, respectively.

Then, the head portions of the respective pins are calked, for example, by ultra-sonic calking to thereby fix the respective disk supporting members 25 and 26 to the respective concave disk supporting portions 20, 21 and 24.

Figure 3:
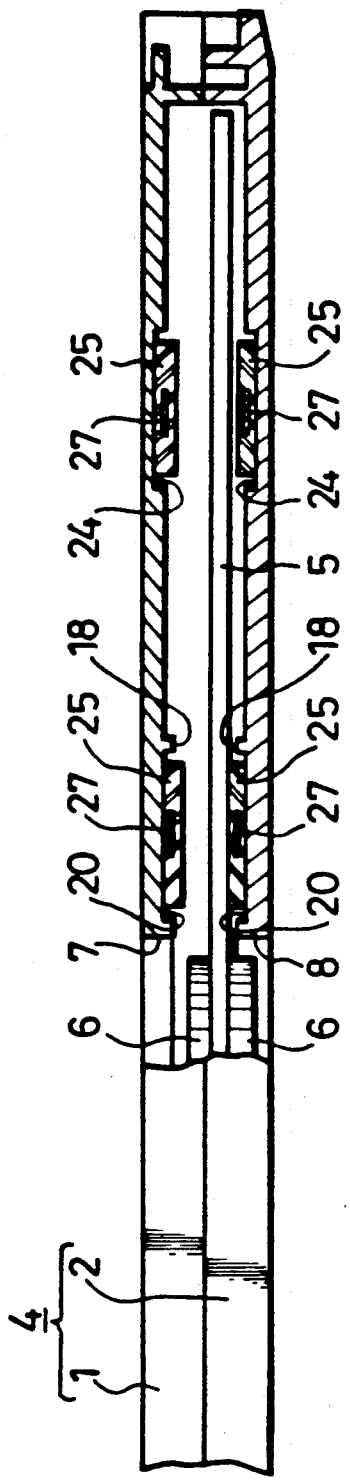
FIG. 3 is an enlarged cross-sectional view showing a portion of the disk cartridge of the present invention.

The disk supporting members 25 and 26 thus fixed in the respective concave disk supporting portions 20, 21 and 24 are thicker than the depth of the supporting portions 20, 21 and 24, so that the upper surfaces of the disk supporting members 25 and 26, that is, the disk supporting faces are protruded from the supporting portions 20, 21 and 24, as shown in FIG. 3. Further, the inner peripheral concave supporting portions 20 and 21 are formed by protruding the frame-shaped ribs 18 and 19 from the inner walls of the upper and lower cartridge halves 1 and 2, whereas the outer peripheral concave supporting portions 24 are formed on the inner walls of the upper and lower halves 1 and 2 in a spot-facing manner. Therefore, the disk supporting surfaces of the disk supporting members 25 and 26 on the inner peripheral side are higher than those of the disk supporting surfaces on the outer peripheral side.

The disk 5 accommodated in the cartridge 4 is therefore supported by the inner peripheral disk supporting members 25 and 26 as shown in FIG. 3 when it is not used, i.e. when the disk 5 is not chucked on the disk table of a recording and/or reproducing apparatus. If the disk 5 is warped, the outer peripheral disk supporting members 25 support the outer peripheral surface of the disk 5, thereby preventing the warp of the disk 5.

In the present embodiment, the disk supporting surfaces of the disk supporting members 25 and 26 are made rough so as to form a sticking preventing portion 32. However, the sticking preventing portion 32 may be of any form provided that it can prevent the disk supporting portion from closely contacting with the disk 5 to form, as a result, a sucking construction between the surface of the disk 5 and the disk supporting surface, for example, when the disk 5 is placed on the disk supporting surface and the disk supporting surface is bent. For example, the sticking preventing portion 32 may be constituted by forming grooves extended radially from the center of the disk supporting surface of the disk supporting member to its outside to prevent the disk 5 from closely contacting with the disk supporting surface. Alternatively, the sticking preventing portion 32 may be constituted by forming radially protruded stripes from the center of the disk supporting surface of the disk supporting member to its outside. Also, the grooves and protruded portions may be spirally formed. Further, a central portion of the disk supporting surface on the upper surface of the disk supporting member is previously made protruded and a supporting portion is protruded on the lower surface of the same at the position corresponding to the protruded central portion to thereby constitute the sticking preventing portion 32 which can prevent the disk supporting surface from being bent when the disk 5 is placed on the disk supporting surface.

The leg members 27 and 28 are not necessarily provided with a pair of attaching bores. The number of provided bores may be more than three so that the leg members are calked at more than three positions. The leg members 27 and 28 can be calked by melting the pins with heat, which is rather effective when the leg members 27 and 28 are made of a metal plate.

The shapes of the disk supporting members 25 and 26 and the leg members 27 and 28 are not limited to those illustrated in the drawings and can be modified in accordance with fixing positions.

Also, the internal construction of the cartridge 4 may be modified, for example, the biasing mechanism for opening and closing the shutter 11 may be selected from a variety of constructions, and the lock mechanism may be omitted.

Since the disk supporting members 25 and 26 are inserted into and engaged with the respective concave disk supporting portions 20, 21 and 24 and the leg members 27 and 28 are fixed by calking the pins 29a, 29b, 30a, 30b, 31a and 31b, the disk supporting members can be stably fixed for a long period of time without secular change. Particularly, since the rigid leg members are fixed by calking, the flexible disk supporting member will never be deformed, and therefore the height of the disk supporting surface can be accurately maintained, whereby the disk 5 can be uniformly and stably supported.

According to the present invention as described above, the flexible disk supporting members fixed on the inner wall of the cartridge for supporting a disk are each integrated with the highly rigid leg member formed by insert forming by the calking of which the disk supporting members are fixed, so that variations in thickness of the calked portions can be suppressed and the height of the calked portions can be easily adjusted. Further, since the calked portion does not require any spacing as before, it is ensured that the disk supporting members can be fixed by calking the leg portions thereof and the height of the disk supporting surface can be accurately maintained, whereby the disk 5 can be uniformly and stably supported.

Since the calked portion on the leg member of the disk supporting member is made high in rigidity, it will not be distorted by vibration and friction of the disk due to shocks caused by dropping the cartridge or the like. The disk supporting members fixed by calking are prevented from being detached from the inner walls of the cartridge halves so that the fidelity of the disk cartridge can be improved.

It is also possible to automatically fix the disk supporting members to the cartridge halves, thereby making it possible to achieve reduction of labor and improve the manufacturing efficiency.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. A disk cartridge, comprising:

a cartridge body formed of a pair of upper and lower halves for rotatably accommodating a disk therein;

disk supporting means fixed to the inner walls of the halves forming the cartridge body at positions respectively corresponding to non-signal recording areas on the inner and outer peripheral sides of the disk;

said supporting means including a plurality of flexible disk supporting members and a corresponding plurality of plate-shaped leg members, said leg members being formed of a material having a higher rigidity relative to the rigidity of the material forming said flexible disk supporting members, each of said leg members having a pair of end portions having a respective central portion therebetween and said central portion being embedded in a corresponding one of said disk supporting members in such a manner that said end portions protrude from said corresponding disk supporting member, each of said leg members being fixed to the inner walls of said halves by caulking and said disk being supportable by said disk supporting members fixed on one of said halves when said disk is not being used.

2. A disk cartridge as claimed in claim 1, wherein each said central portion of said plate-shaped leg members is embedded in a corresponding one of said disk supporting members by insert molding.

3. A disk cartridge as claimed in claim 1, wherein each of said flexible disk supporting members has a disk supporting surface portion and a rear surface portion, said disk supporting surface portion and said rear surface portion being integrated through at least one bore formed through said central portion of said leg member.

4. A disk cartridge as claimed in claim 1, wherein each of said leg members is made of metal.

5. A disk cartridge as claimed in claim 1, wherein each of said disk supporting members has a predetermined melting point and each of said leg members is made of synthetic resin having a melting point that is higher than said predetermined melting point.

6. A disk cartridge comprising:

a hollow cartridge body formed of an upper section and a lower section for rotatably accommodating a disk therein;

disk supporting means fixed to inner walls of the section at positions respectively corresponding to non-signal recording areas on inner and outer peripheral sides of the disk;

said supporting means including a plurality of flexible disk supporting members and a corresponding plurality of plate-shaped leg members, said leg members being formed of a material having a higher rigidity relative to the rigidity of the material forming said disc supporting members, each of said leg members having a pair of end portions and a respective central portion therebetween and said central portion being embedded in and surrounded by a corresponding one of said disk supporting members in such a manner that said end portions protrude from said corresponding disc supporting member, each of said leg members being fixed to the inner walls of said sections by ultrasonic fusion so that said flexible disk supporting members are in contact with said inner walls and said disk being supportable by said disk supporting members fixed on one of said sections when said disk is not being used.

* * * * *